United States Patent Office 3,479,575
Patented Nov. 18, 1969

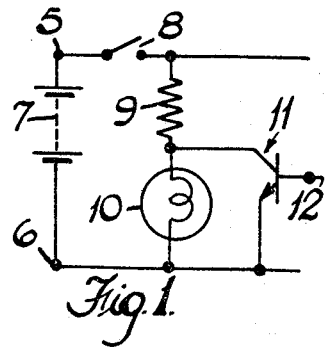
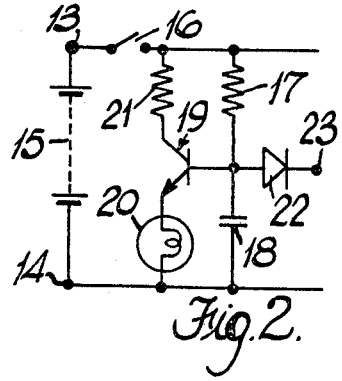
Fig. 1.
Fig. 2.
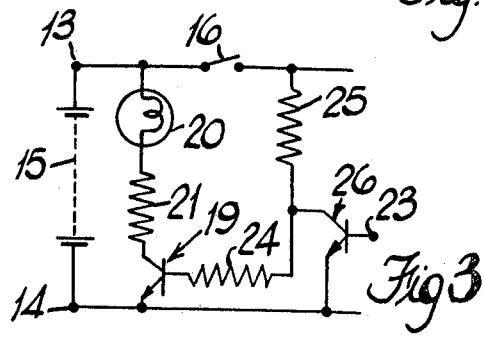
Fig 3
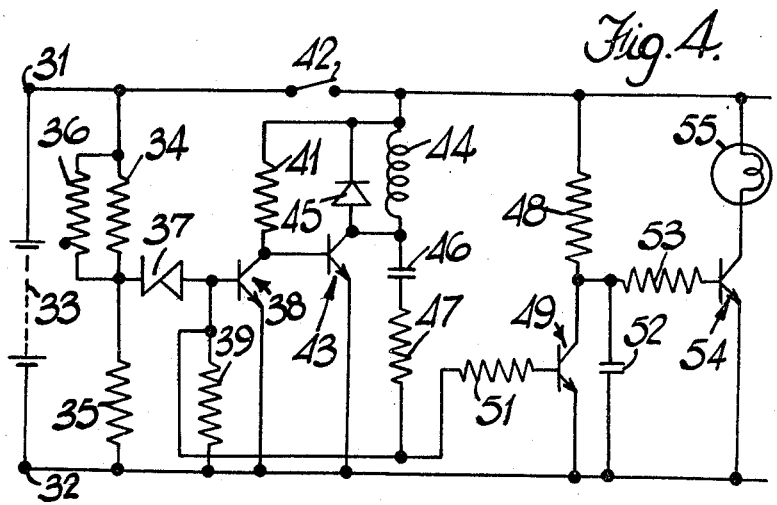
Fig. 4.

3,479,575
INDICATING DEVICE FOR A BATTERY CHARGING SYSTEM
Maurice James Wright, Harborne, Birmingham, and Roger William Nolan, Redditch, England, assignors to Joseph Lucas (Industries) Limited, Birmingham, England
Filed Mar. 10, 1967, Ser. No. 622,280
Claims priority, application Great Britain, Mar. 25, 1966, 13,261/66
Int. Cl. H02j 7/04, 7/16
U.S. Cl. 320—48                    5 Claims

ABSTRACT OF THE DISCLOSURE

Transistor circuits for illuminating a warning lamp on a road vehicle when the generator is not producing an output. The transistor can be in series with the warning lamp and turned off when the generator produces an output, or in parallel with the warning lamp and turned on to short-circuit the warning lamp when the generator produces an output.

---

This invention relates to battery charging systems for use in road vehicles, and has for its object to provide in a battery charging system a convenient warning lamp circuit for indicating when the generator is producing an output. The scope of the invention is defined in the claims.

In the accompanying drawings, FIGURES 1 to 4 respectively are circuit diagrams illustrating four examples of the invention.

Referring to FIGURE 1, there are provided first and second terminals 5, 6 between which in use the battery 7 of a vehicle is connected. The battery 7 is charged by a generator through a voltage regulator, the generator being constituted either by a dynamo and associated cut-out, or by an alternator and associated full wave rectifier.

Connected in series across the terminals 5, 6 are a switch 8, a resistor 9, and a warning lamp 10. The switch 8 will normally be the ignition switch of the vehicle, but in diesel engined vehicles the switch 8 is the switch used to control various loads operated by the battery 7.

The junction of the resistor 9 and warning lamp 10 is connected to the collector of an n-p-n transistor 11, the emitter of which is connected to the terminal 6. The base of the transistor 11 is connected to a terminal 12 which in use is associated with the generator of the vehicle, the arrangement being such that when the generator is producing an output the terminal 12 is maintained at a positive potential with respect to the terminal 6. Where, as is preferred, the generator is an alternator, the terminal 12 can be connected to a phase point of the alternator through a smoothing network, or to the star point of the alternator either directly or through a smoothing network.

In use, when the switch 8 is closed, current flows through the switch 8, the resistor 9 and the lamp 10 so that the lamp 10 is illuminated. However, as soon as the generator produces an output, the terminal 12 becomes positive with respect to the terminal 6, and so base current flows in the transistor 11 to turn it on. Current flowing through the resistor 9 is now diverted through the collector and emitter of the transistor 11, so that the lamp 10 is extinguished.

The terminal 12 need not be directly connected to the generator, provided that it is connected to some point in the battery charging system which assumes a positive potential with respect to the terminal 6 when the generator produces an output. The terminal 12 could, for example, be connected to the field winding of the generator via a suitable smoothing network.

The resistor 9 may be constituted by a non-linear conductor, for example a constant current source, a ballast lamp or a positive temperature coefficient resistor, so as to reduce power dissipation in the circuit when the transistor 11 is conducting.

Referring now to FIGURE 2, there are provided first and second terminals 13, 14 between which in use the battery 15 of a road vehicle is connected. The battery 15 is charged through a voltage regulator by a generator, which may be an alternator and associated full wave rectifier, or a dynamo and associated cut-out.

Connected in series across the terminals 13, 14 are a switch 16, a resistor 17 and a capacitor 18. The switch 16 will normally be the ignition switch of the vehicle, but in a diesel-engine vehicle it will be constituted by the switch which controls various loads served by the battery 15. The junction of the resistor 17 and capacitor 18 is connected to the base of an n-p-n transistor 19, the emitter of which is connected to the terminal 14 through a warning lamp 20, and the collector of which is connected to the terminal 13 through a resistor 21 and the switch 16 in series. The resistor 21 may be returned directly to the terminal 13. The junction of the resistor 17 and capacitor 18 is further connected through the anode-cathode path of a diode 22 to a terminal 23.

In use, when the switch 16 is closed, current flows through the switch 16 and resistor 17 to charge the capacitor 18. As the capacitor 18 charges, the base of the transistor 19 becomes increasingly positive with respect to its emitter until a point is reached at which the transistor 19 can conduct, current then flowing through the resistor 21 to illuminate the warning lamp 20.

Where, as is preferred, an alternator is used as the generator, the terminal 23 is connected to a phase point of the alternator or alternatively is connected to the star point of the alternator. In either case, when the alternator is producing an output, the potential of the terminal 23 will vary between the positive battery potential and the negative battery potential. When the terminal 23 is at the negative battery potential, the capacitor 18 discharges through the diode 22, and so the potential at the base of the transistor 19 becomes insufficient to maintain the transistor 19 conductive, so that the warning lamp 20 is extinguished. When the potential of the terminal 23 assumes the positive battery potential, the capacitor 18 can start to charge again, but the time constants are so chosen that so long as the alternator is producing an output, the capacitor 18 does not have time to charge sufficiently to allow the transistor 19 to conduct before the capacitor 18 discharges again through the diode 22. Thus, as long as the alternator is producing an output, the transistor 19 remains non-conductive and the warning lamp 20 remains extinguished.

It will, of course, be appreciated that the terminal 23 can be connected in other places in the battery charging system, provided the connection is such that when the generator is producing an output, the potential at the junction of the resistor 17 and capacitor 18 is never allowed to become sufficiently positive to turn the transistor 19 on. The terminal 23 could, for example, be connected to the field winding of the generator.

FIGURE 3 illustrates a modification of FIGURE 2 in which the warning lamp 20 is connected in the collector circuit of the transistor 19, and the collector circuit of the transistor 19 is connected directly to the terminal 13, instead of through the switch 16. Moreover, the components 17, 18, 22 are omitted, and the base of the transistor 179 is now connected to the terminal 13 through resistors 24, 25 in series with the switch 16. The junction of the resistors 24, 25 is connected to the collector of a second n-p-n transistor 26, the emitter of which is connected to the terminal 14 and the base of which is connected to the terminal 23.

In operation, the transistor 19 is turned on immediately the switch 16 is closed, there being no delay as in the case of FIGURE 2. The terminal 23 in FIGURE 3 must be associated with the battery charging system in such a way that when the generator produces an output, the transistor 26 is turned on. Current is then diverted from the base of the transistor 19, which turns off so that the lamp 20 is extinguished.

Referring now to the example shown in FIGURE 4, there are provided first and second terminals 31, 32 between which in use the battery 33 of a vehicle is connected. The battery is charged by a generator, which may be a dynamo and associated cutout, or an alternator and associated full wave rectifier.

Connected in series across the terminals 31, 32 are a pair of resistors 34, 35, the resistor 34 being bridged by a thermistor 36. The junction of the resistors 34, 35 is connected through a Zener diode 37 to the base of an n-p-n transistor 38 having its emitter connected to the terminal 32, its base connected to the terminal 32 through a resistor 39, and its collector connected to the terminal 31 through a resistor 41 in series with the switch 42. The switch 42 will normally be the ignition switch of the vehicle, but in diesel-engined vehicles the switch 42 is constituted by a switch which controls loads served by the battery 33.

The collector of the transistor 38 is further connected to the base of an n-p-n transistor 43, the emitter of which is connected to the line 32. The collector of the transistor 43 is connected to the terminal 31 through the field winding 44 of the generator and the switch 42 in series, the winding 44 being bridged by a diode 45. Moreover, the collector of the transistor 43 is coupled to the base of the transistor 38 through a capacitor 46 and a resistor 47 in series.

The part of the circuit so far described acts as a voltage regulator for controlling the generator output, and acts in the following manner. The battery voltage is sensed accurately by the resistors 34, 35, which are permanently connected across the battery but dissipate very little power, so that the permanent dissipation of power is not objectionable. Assuming that the switch 42 is closed, then provided the voltage across the terminals 31, 32 is below a predetermined value, the Zener diode 37 does not conduct, and current flows from the terminal 31 through the switch 42, the resistor 41 and the base-emitter path of the transistor 43 to turn the transistor 43 on, so that full field current flows in the winding 44. As the generator output increases, the voltage between the terminals 31, 32 rises until the Zener diode 37 breaks down, at which point base current is provided to the transistor 38, which removes the base current from the transistor 43. By virtue of the feedback path through the capacitor 46 and resistor 47, the regulator oscillates between a first state with the transistor 43 fully conductive and the transistor 38 off, and a second state with the transistor 38 fully conductive and the transistor 43 off. The mark-space ratio is determined by the current flowing through the Zener diode 37, which in turn is determined by the voltage between the terminals 31, 32, and the arrangement is such that the mean current flow in the field winding maintains the voltage between the terminals 31, 32 approximately constant.

In addition to the voltage regulator, the system includes a warning lamp circuit, which as shown includes a resistor 48, one end of which is connected to the terminal 31 through the switch 42, and the other end of which is connected to the collector of an n-p-n transistor 49, the emitter of which is connected to the terminal 32 and the base of which is connected through a resistor 51 to the base of the transistor 38. The collector of the transistor 49 is further connected to the terminal 32 through a capacitor 52, and is also connected through a resistor 53 to the base of an n-p-n transistor 54, the emitter of which is connected to the terminal 32 and the collector of which is connected to the terminal 31 through a warning lamp 55.

The arrangement is such that when the switch 42 is closed, current flows through the resistor 48 and resistor 53 to turn the transistor 54 on, so that the warning lamp 55 is illuminated. However, as soon as the generator is producing an output which is sufficient to cause the Zener diode 37 to conduct, current can flow through the Zener diode 37 and the resistor 51 to turn the transistor 49 on, so that base current is removed from the transistor 54 and the warning lamp 55 is extinguished. The various component values are of course chosen so that the base current drawn by the transistor 49 does not affect the operation of the voltage regulator.

Having thus described our invention what we claim as new and desire to secure by Letters Patent is:

1. In a battery charging system for use in a road vehicle, first and terminals between which in use the battery is connected, a series circuit connected across said terminals and including a switch, a resistor and a base-emitter path of a transistor, a series circuit connected across the first and second terminals and including the collector-emitter path of the transistor and a warning lamp, and a capacitor which must be charged before the transistor is turned on by current flow through said resistor, the capacitor being maintained sufficiently discharged to ensure that the transistor is not turned on when the generator is producing an output.

2. A system as claimed in claim 1 in which said switch is the ignition switch of the vehicle.

3. A system as claimed in claim 1 in which the vehicle is a diesel-engined vehicle and said switch is a switch controlling the flow of current to loads served by the battery.

4. A battery charging system for use in a road vehicle, comprising in combination first and second terminals, a battery connected between the first and second terminals, a series circuit interconnecting the first and second terminals and incorporating a switch, a first resistor and a capacitor, a transistor, means coupling the base of said transistor to the junction of said first resistor and said capacitor, a warning lamp coupling the emitter of said transistor to said second terminal, a circuit coupling the collector of said transistor to said first terminal, said circuit incorporating a second resistor, and means maintaining said capacitor sufficiently discharged to ensure that the transistor is not turned on when the generator of the road vehicle is producing an output.

5. A battery charging system for use in a road vehicle, comprising in combination first and second terminals, a battery connected between said terminals, a transistor having its collector and emitter connected between said terminals in series with a warning lamp, means incorporating a switch providing base current to said transistor to turn said transistor on when said switch is closed, a voltage regulator for controlling current flow in a field winding of the generator of the road vehicle, said voltage regulator incorporating a Zener diode, means coupling said Zener diode to said terminals whereby said Zener diode conducts when the voltage between said terminals exceeds a predetermined value, and the regulator further incorporating circuit means responsive to conduction of said Zener diode for controlling current flow in said field winding, the system further including a second transistor which when conductive removes base current from the first-mentioned transistor to turn off said warning lamp, and a circuit connection from said Zener diode to said second transistor whereby when said Zener diode conducts said second transistor also conducts to turn off the first transistor and thereby extinguish said warning lamp.

(References on following page)

References Cited

UNITED STATES PATENTS

| | | | |
|---|---|---|---|
| 3,308,306 | 3/1967 | Bagno | 307—66 |
| 3,417,309 | 12/1968 | Schuyler | 320—64 X |
| 3,157,870 | 11/1964 | Marino et al. | 320—48 X |
| 3,210,727 | 10/1965 | McLaughlin et al. | 320—48 X |
| 3,231,811 | 1/1966 | Peras | 320—48 |
| 3,258,672 | 6/1966 | Godshalk et al. | 320—25 |
| 3,321,754 | 5/1967 | Grimm et al. | 340—249 |
| 3,336,519 | 8/1967 | Grimm | 320—48 |

JOHN F. COUCH, Primary Examiner

STANLEY WEINBERG, Assistant Examiner

U.S. Cl. X.R.

320—64; 322—99